United States Patent
Sung

(10) Patent No.: US 12,004,231 B1
(45) Date of Patent: Jun. 4, 2024

(54) NON-BLIND SCHEDULING OF A PHYSICAL DOWNLINK CONTROL CHANNEL (PDCCH) CONTROL CHANNEL ELEMENT (CCE) AGGREGATION LEVEL (AL) FOR COMMON SEARCH SPACE (CSS)

(71) Applicant: T-MOBILE INNOVATIONS LLC, Overland Park, KS (US)

(72) Inventor: Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 479 days.

(21) Appl. No.: 17/391,901

(22) Filed: Aug. 2, 2021

(51) Int. Cl.
*H04W 74/0833* (2024.01)
*H04W 72/1263* (2023.01)
*H04W 72/542* (2023.01)
*H04W 74/00* (2009.01)

(52) U.S. Cl.
CPC ... *H04W 74/0841* (2013.01); *H04W 72/1263* (2013.01); *H04W 72/542* (2023.01); *H04W 74/006* (2013.01)

(58) Field of Classification Search
None
See application file for complete search history.

(56) References Cited

U.S. PATENT DOCUMENTS

| | | | |
|---|---|---|---|
| 9,019,823 B1* | 4/2015 | Raparthy | H04W 28/0247 370/230 |
| 2015/0103761 A1* | 4/2015 | Chen | H04W 74/0833 370/329 |
| 2016/0174256 A1* | 6/2016 | Ratasuk | H04L 43/16 370/329 |
| 2022/0400511 A1* | 12/2022 | Li | H04L 1/20 |

* cited by examiner

*Primary Examiner* — Jutai Kao
(74) *Attorney, Agent, or Firm* — Shook, Hardy & Bacon L.L.P.

(57) ABSTRACT

Methods, media, and systems are provided for supporting non-blind scheduling of a physical downlink control channel (PDCCH) control channel element (CCE) aggregation level (AL) for a common search space (CSS). In aspects, one or more signals corresponding to a device are received. Additionally, a request for a random-access channel response is received from the device. In addition, a radio frequency condition for the device is determined based on the one or more signals. Upon receiving the request and based on the radio frequency condition, an assigned physical random access channel (PRACH) preamble group is broadcast to the device via a broadcasting message, the PRACH preamble group corresponding to the CSS and also for scheduling the PDCCH CCE AL.

20 Claims, 8 Drawing Sheets

NON-BLIND SCHEDULING OF A PHYSICAL DOWNLINK CONTROL CHANNEL (PDCCH) CONTROL CHANNEL ELEMENT (CCE) AGGREGATION LEVEL (AL) FOR COMMON SEARCH SPACE (CSS)

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to systems and methods for adapting a cell-level beamforming mode, substantially as shown in and/or described in connection with at least one of the figures, and as set forth more completely in the claims.

In aspects set forth herein, and at a high level, non-blind scheduling of a physical downlink control channel (PDCCH) control channel element (CCE) aggregation level (AL) for a common search space (CSS) is supported. One or more signals corresponding to a device are received. In aspects, the one or more signals include downlink signal information as determined by the device. Additionally, a request for a random-access channel response is received from the device. A radio frequency condition for the device is determined based on the one or more signals. Upon receiving the request and based on the radio frequency condition, an assigned physical random access channel (PRACH) preamble group is determined and broadcast to the device via a broadcasting message. The PRACH preamble group corresponds to the CSS. The PRACH preamble is used for scheduling the PDCCH CCE AL.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
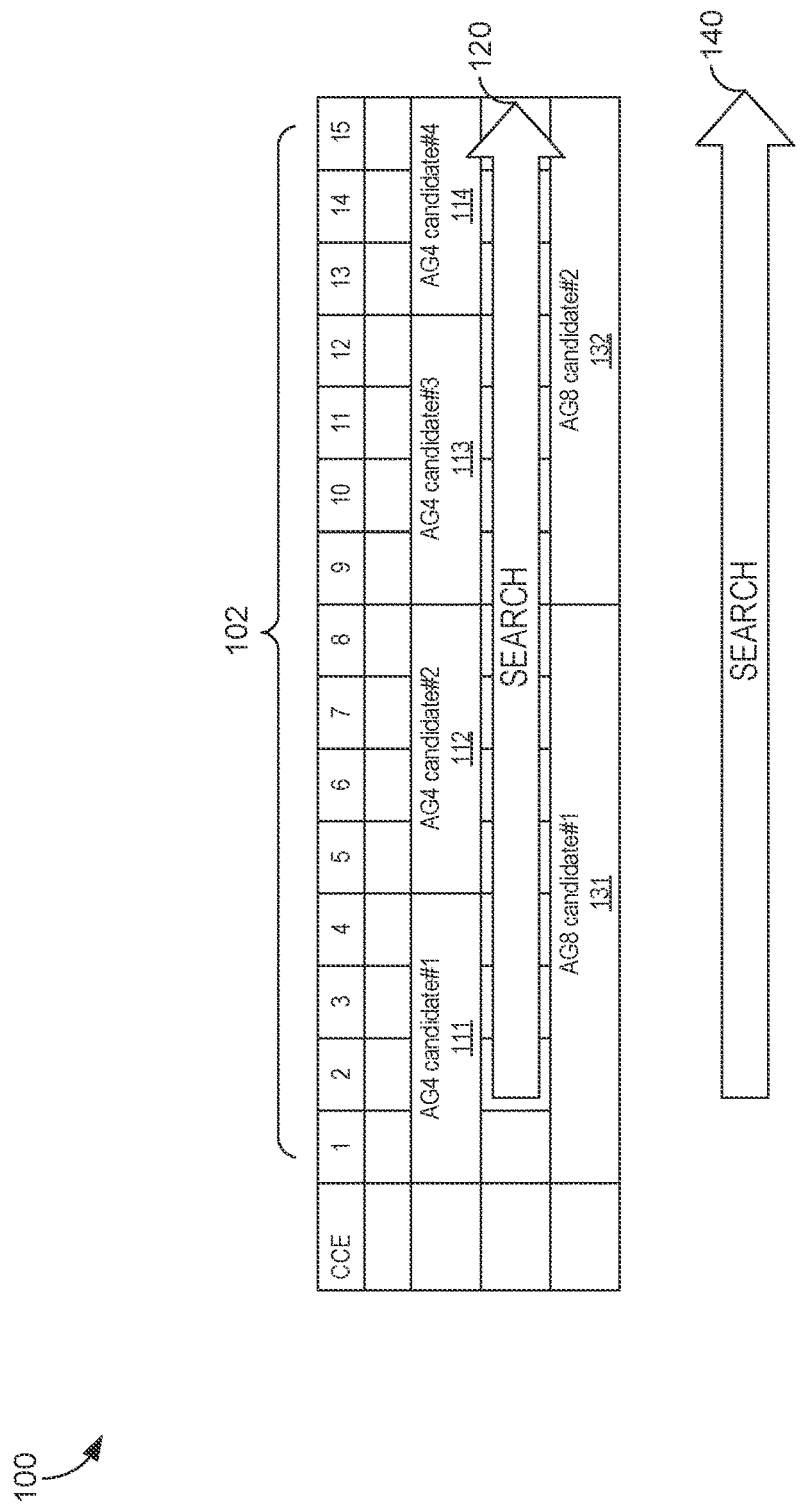
FIG. 1 depicts an example blind search in a common search space for use in implementations of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| AL | Aggregation Level |
| APN | Access Point Names |
| CCE | Control Channel Element |
| CD-ROM | Compact Disk Read Only Memory |
| CDMA | Code Division Multiple Access |
| CRC | Cyclic Redundancy Check |
| CSI | Channel Signal Information |
| CSI-RS | Channel State Information Reference Signal |
| CSS | Common Search Space |
| DCI | Downlink Control Information |
| DL | Downlink |
| eNB | Evolved Node B |
| gNB | Next Generation Node B |
| GPRS | General Packet Radio Service |
| GSM | Global System for Mobile communications |
| DoNAS | Data over Non-Access Stratum |
| DVD | Digital Versatile Discs |
| EEPROM | Electrically Erasable Programmable Read Only Memory |
| LTE | Long Term Evolution |
| MIMO | Multiple-Input and Multiple-Output |
| MMS | Multimedia Message Service |
| MTC | Machine Type Communication |
| PC | Personal Computer |
| PDA | Personal Digital Assistant |
| PDCCH | Physical Downlink Control Channel |
| PMI | Pre-Coding Matrix Indicator |
| PRACH | Physical Random Access Channel |
| RACH | Random Access Channel |
| RAM | Random Access Memory |
| RAN | Radio Access Network |
| RF | Radio-Frequency |
| RNTI | Radio Network Temporary Identifier |
| ROM | Read Only Memory |
| RSRP | Reference Transmission Receive Power |

| | |
|---|---|
| RSRQ | Reference Transmission Receive Quality |
| SINR | Signal-to-Interference-plus-Noise Ratio |
| SMS | Short Message Service |
| SON | Self-Organizing Network |
| SRS | Sounding Reference Signal |
| TDMA | Time Division Multiple Access |
| UE | User Equipment |
| UL | Uplink |

Further, various technical terms are used throughout this description. An illustrative resource that fleshes out various aspects of these terms can be found in Newton's Telecom Dictionary, 31st Edition (2018).

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, conventional systems that transmit information corresponding to CSS fail to take any action that results in a non-blind scheduling of PDCCH CCE AL. For example, conventional systems blindly provide instructions associated with PDCCH CCE AL. The conventional systems provide a lack of information regarding the particular CCE AL for each UE to successfully decode PDCCH. As such, in conventional methods, a search corresponding to the CSS requires each UE to perform blind decoding of multiple PDCCH candidates to see whether an RNTI matches with the RNTI scrambled with a DCI CRC. This blind decoding is a trial-and-error process that uses large amounts of processing power and is time consuming.

The blind search begins with CCE AL 4 having four candidates. If there is no match with a first candidate of the four candidates, then the conventional methods continue to perform channel estimation on the rest of the four candidates until there is a match. If the RNTI does not blindly match with any of the four candidates, then CCE AL 8 candidates are considered next and blind channel estimation is performed on these candidates until there is a match. If the RNTI does not blindly match with any of the CCE AL 8 candidates, then the conventional methods next consider CCE AL 16 and perform blind channel estimation on this candidate. Upon matching the RNTI to the DCI CRC, the UE drives the DCI information to acquire DL/UL scheduling information.

This blind matching process used by conventional methods drains UE battery life, wastes time during the long and complex matching procedure, increases a number of scheduling users per slot, and reduces PDCCH capacity. The present technology disclosed herein improves upon the deficiencies in the conventional systems. For example, the present technology supports the non-blind scheduling of PDCCH CCEL AL for CSS. The non-blind scheduling reduces UE battery consumption that occurs during the blind scheduling discussed above. Further, the non-blind scheduling reduces the number of scheduling users per slot and thus improves PDCCH capacity. Furthermore, the non-blind scheduling reduces computational complexity performed during the blind scheduling and reduces the time taken to perform scheduling.

Accordingly, one aspect of the present technology includes a system for supporting a non-blind scheduling of a PDCCH CCE AL for a CSS. The system comprises an antenna array comprising one or more antenna elements and one or more processors configured to execute operations. The operations comprise receiving one or more signals corresponding to a device and receiving a request for a random-access channel response from the device. Further, the operations comprise determining a radio frequency condition for the device based on the one or more signals. Upon receiving the request and based on the radio frequency condition, the operations comprise broadcasting an assigned PRACH preamble group to the device for scheduling the PDCCH CCE AL, the assigned PRACH preamble group corresponding to the CSS.

In another aspect of the present technology, a computerized method for non-blind scheduling of a PDCCH CCE AL for a CSS. The method comprises receiving one or more signals corresponding to a device and receiving a request for a random-access channel response from the device. Further, the method comprises determining a radio frequency condition for the device based on the one or more signals. Based on the radio frequency condition, the method determines a PRACH preamble group for the device for scheduling the PDCCH CCE AL, the PRACH preamble group corresponding to the CSS. Upon receiving the request, the method broadcasts the PRACH preamble group to the device.

In yet another aspect of the present technology, non-transitory computer-readable storage media having computer-executable instructions embodied thereon that, when executed by one or more processors, cause the one or more processors to perform operations for non-blind scheduling of a PDCCH CCE AL for a CSS. The operations comprise receiving one or more downlink signals corresponding to a device and receiving a request for a random-access channel response from the device. The operations further comprise determining a radio frequency condition for the device based on the one or more downlink signals. The radio frequency condition corresponds to whether the one or more downlink signals is above a threshold. Based on the radio frequency condition, the operations comprise determining a PRACH preamble group for the device for scheduling the PDCCH CCE AL, the PRACH preamble group corresponding to the CSS. Further, upon receiving the request, the operations broadcast the PRACH preamble group to the device.

Turning to FIG. 1, example blind search 100 includes a CSS PDCCH blind decoding procedure. In blind decoding procedures, a UE does not know: the number of CCEs occupied by the current PDCCH, the DCI format information, and where the information it needs is located. For decoding, the UE must determine the exact location (CCE index) and the RNTI scrambling code. Due to the UE not knowing this information and because these values change dynamically, the UE has to try to decode PDCCH/DCI using a large amount of different types of parameters (e.g., CCE Index, Aggregation Level, RNTI) based on a blind trial-and-error method. The predefined region in which a UE performs this blind decoding is a Search Space.

With respect to "UE" as used herein, a UE (also referenced herein as a "user device" or "device") can include any device employed by an end-user to communicate with a wireless telecommunications network. A UE can include a mobile device, a mobile broadband adapter, an IoT device, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 800 described herein with respect to FIG. 8.

Example blind search 100 includes CCEs 102 (e.g., CCEs 1-15 are depicted for simplicity); CCE AL 4 having a first candidate 111, a second candidate 112, a third candidate 113, and a fourth candidate 114; a search 120 of the CCE AL 4 candidates; CCE AL 8 having a first candidate 131 and a second candidate 132; and a search 140 of the CCE AL 8 candidates. The CCE AL 4 first candidate 111 corresponds to CCEs 1-4. The CCE AL 4 second candidate 112 corresponds to CCEs 5-8. The CCE AL 4 third candidate 113 corresponds to CCEs 9-12. The CCE AL 4 fourth candidate 114 corresponds to CCEs 12-16 (CCE 16 not depicted). Further, CCE AL 8 candidate 131 corresponds to CCEs 1-8 and CCE AL 8 candidate 132 corresponds to CCEs 9-16 (CCE 16 not depicted).

The search 120 of the CCE AL 4 candidates (candidates 111-114) begins with the search of the first candidate 111. As such, channel estimation is performed on the first candidate 111 consisting of CCEs 1-4. When RNTI fails to match the RNTI scrambled with DCI CRC, channel estimation is performed on the second candidate 112 on CCEs 5-8. When RNTI fails to match again, channel estimation is performed on the third candidate 113 on CCEs 9-12. When RNTI fails to match yet again, channel estimation is performed on the fourth candidate 114 on CCEs 13-16 (CCE 16 not depicted).

Furthermore, when RNTI fails to match each of the CCE AL 4 candidates, channel estimation is then performed on CCE AL 8 candidates. The search 140 of the CCE AL 8 candidates begins with a search of the first candidate 131 having CCEs 1-8. If the UE performs PDCCH decoding that checks for RNTI matching but fails to match, channel estimation is then performed for the second candidate 132 having CCEs 9-16. If RNTI does not match with any of the CCE AL 8 candidates, then PDCCH decoding is performed on CCE AL 16 candidate (not depicted) having CCEs 1-16.

Figure 2:
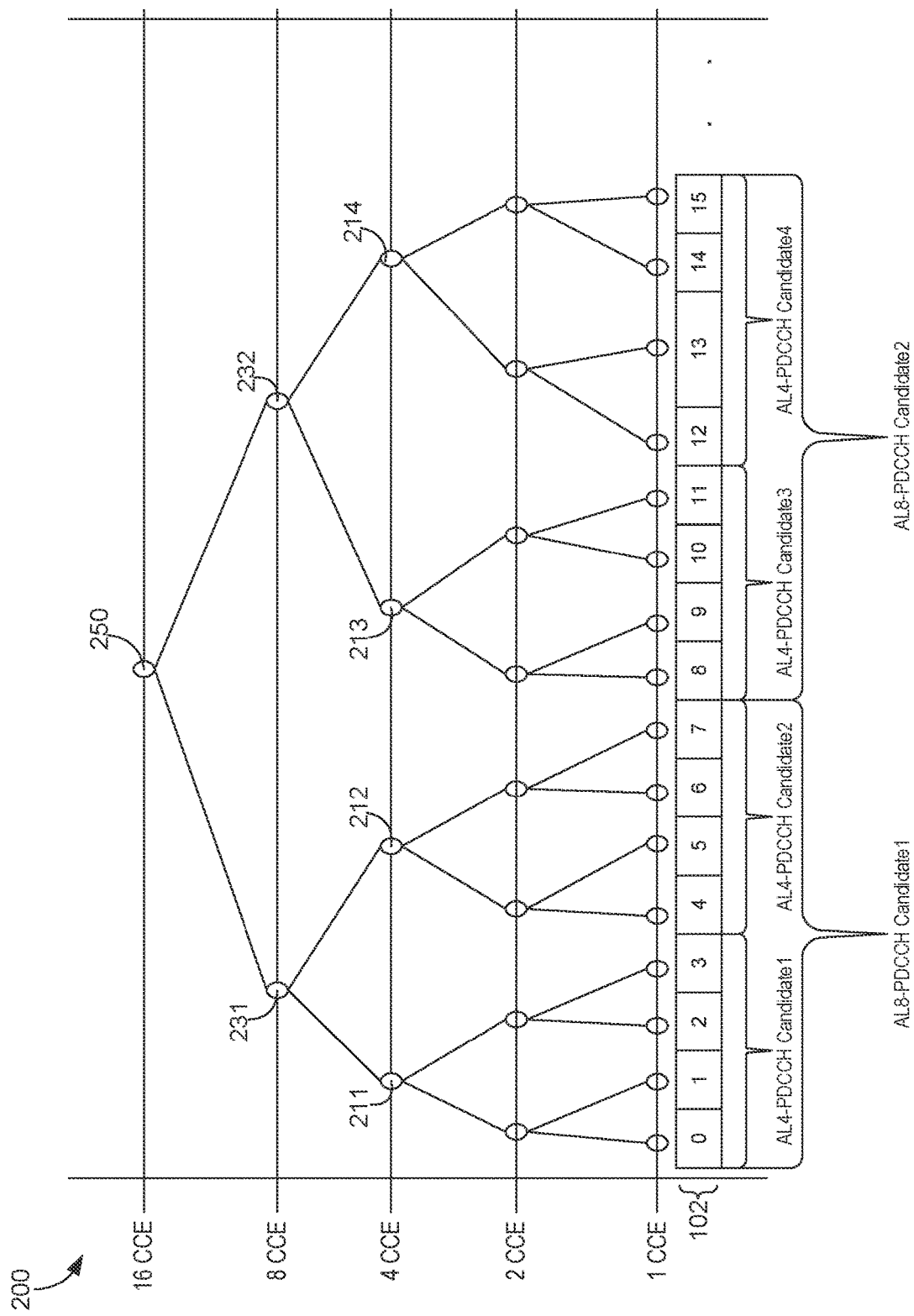
FIG. 2 illustrates a diagram of an example common search space environment in which implementations of the present disclosure may be employed, in accordance with aspects herein.

Turning to FIG. 2, CSS 200 comprises a diagram depicting CCEs 102 (CCEs 0-15) and CCE AL 4 having a first candidate 211, a second candidate 212, a third candidate 213, and a fourth candidate 214. The first candidate 211 corresponds to CCEs 0-3. The second candidate 212 corresponds to CCEs 4-7. The third candidate 213 corresponds to CCEs 8-11. The fourth candidate 214 corresponds to CCEs 12-15.

Further, CCE AL 8 has candidates 231 and 232. Candidate 231 corresponds to CCEs 0-7 and candidate 232 corresponds to CCEs 8-15. Lastly, CCE AL 16 has candidate 250, which corresponds to 16 CCEs (CCEs 0-15). Furthermore, a UE-Specific Search Space may also include CCE AL 2, having eight candidates that each have two CCEs. The UE-Specific Search Space may also include CCE AL 1, having sixteen candidates that each have one CCE. For a conventional system using CSS, blind operation of PDCCH CCE AL is used at least in part due to a lack of information regarding the necessary CCE AL for each UE to successfully decode PDCCH.

Figure 3:
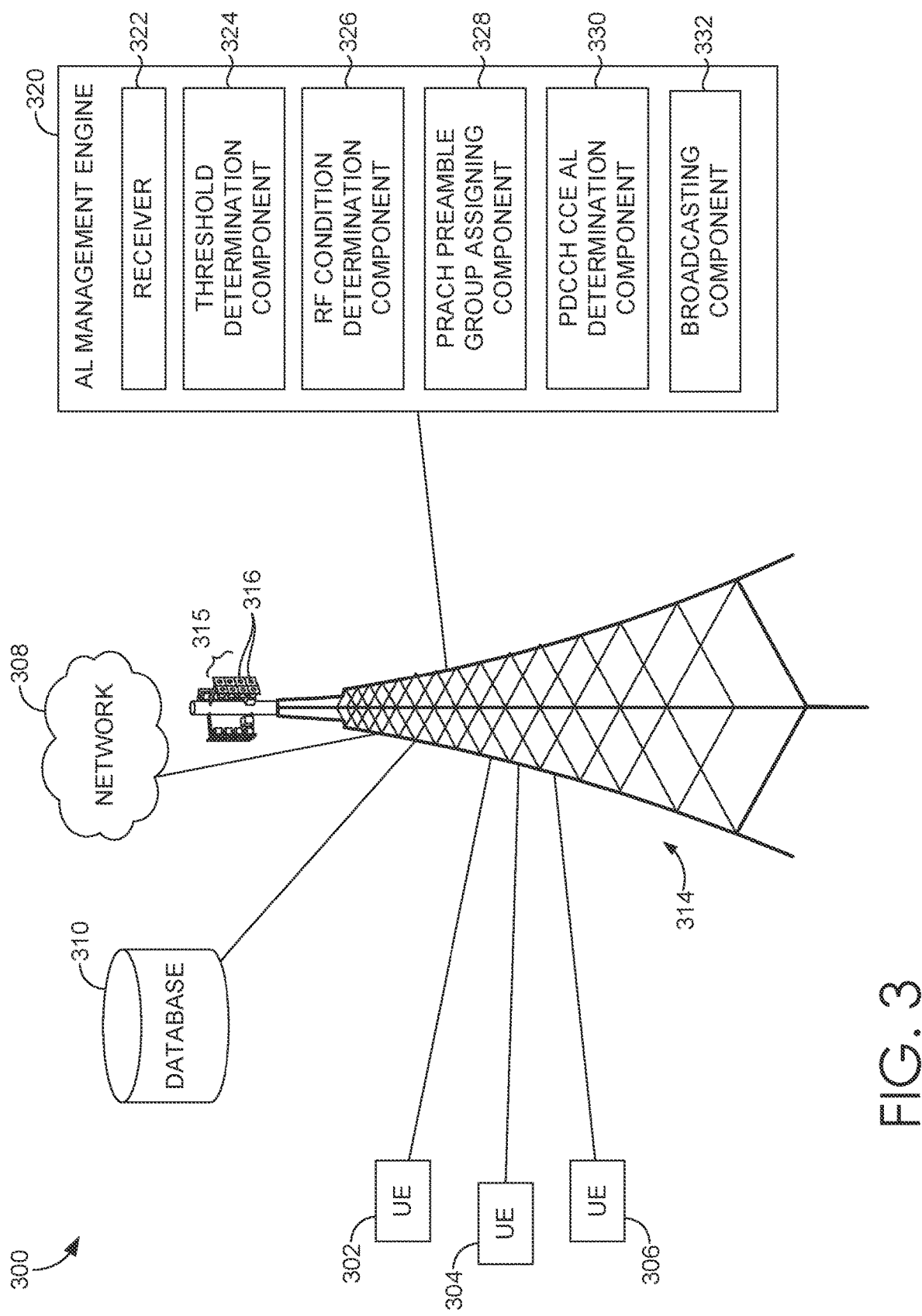
FIG. 3 depicts an example network environment for an aggregation level management system for use in implementations of the present disclosure, in accordance with aspects herein.

Turning now to FIG. 3, network environment 300 comprises UEs 302, 304, and 306; network 308; database 310; cell site 314 having a first antenna array 315, which has antenna elements 316; and AL management engine 320. AL management engine 320 comprises receiver 322, threshold determination component 324, RF condition determination component 326, PRACH preamble group assigning component 328, PDCCH CCE AL determination component 330, and broadcasting component 332. Network environment 300 is but one example of a suitable network environment and is not intended to suggest any limitation as to the scope of use or functionality of the invention. Neither should the network environment be interpreted as having any dependency or requirement relating to any one or combination of components illustrated.

Beginning with UEs 302, 304, and 306, the UEs may take on a variety of forms including: a PC, a user device, a smart phone, a smart watch, a laptop computer, a mobile phone, a mobile device, a tablet computer, a wearable computer, a PDA, a server, a CD player, an MP3 player, a GPS device, a video player, a handheld communications device, a workstation, a router, a hotspot, and any combination of these delineated devices, or any other device (such as the computing device 800 in FIG. 8) that communicates via wireless communications to interact with a public or private network. In aspects, UEs 302, 304, and 306 may be capable of communicating using 4G (e.g., LTE) and/or 5G. In some aspects, UEs 302, 304, and 306 may be E-UTRAN New Radio—Dual Connectivity devices (ENDC). ENDC allows a user device to connect to an LTE eNB that acts as a master node and a 5G gNB that acts as a secondary node. As such, in these aspects, UEs 302, 304, and 306 may access both LTE and 5G simultaneously, and in some cases, on the same spectrum band. As shown in FIG. 3, UEs 302, 304, and 306 communicate by way of transmission with cell site 314 using one or more of 4G and 5G, sometimes simultaneously. Additionally, other wireless communication protocols may be utilized in conjunction with aspects described herein, as LTE and 5G are used for exemplary purposes only and not for limitation.

Turning to network 308, the network 308 may be a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 308 may include multiple networks, as well as being a network of networks, but is shown in more simple form so as to not obscure other aspects of the present disclosure. Network 308 may be part of a telecommunications network that connects subscribers to their immediate service provider.

In embodiments, network 308 is associated with a telecommunications provider that provides services to user devices, such as UE 302. For example, network 308 may provide voice services to user devices or corresponding users that are registered or subscribed to utilize the services provided by the telecommunications provider. Although it is contemplated that network 308 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), or the like; network 308 is depicted in FIG. 3 as a 5G network. In embodiments, a provider network corresponding to the telecommunications provider may allow the delivery of Internet Protocol services to UEs 302, 304, and 306; and may interface with other external networks, such as private Internet Protocol networks. Other wireless stations (not depicted) may connect to the network 308 via one or more backhaul links.

According to one aspect, the provider network corresponding to the telecommunications provider may include various network elements, such as a gateway, a support node, a serving node, a router, a switch, a bridge, as well other network elements pertaining to various network-related functions, such as billing, security, authentication and authorization, network polices, subscriber profiles, etc. In some aspects, the provider network may include an Internet Protocol Multimedia Sub-system network. The Internet Protocol Multimedia Sub-system network may include a network for delivering Internet Protocol multimedia services and may provide media flows between UEs and external Internet Protocol networks or external circuit-switched networks (not depicted).

Network 308 may also comprise an access network that enables UEs 302, 304, and 306 to connect to a provider network for Internet access, non-IP data delivery, cloud computing, mobile telephone service, SMS message service, MMS message service, and/or other types of data services. Further, the access network may establish a packet data network connection between UE 302 and the provider network via one or more APNs. For example, the access network may establish an Internet Protocol connection between UE 302 and the provider network. In another embodiment, the access network may provide access to a service or application layer network, a cloud network, a MEC network, a fog network, etc. Furthermore, the access network may enable a server device to exchange data with UE 302 using a non-Internet Protocol data delivery method, such as DoNAS, for example.

Further, in some embodiments, the access network may include a 5G access network or another advanced network, such as an LTE network. Additionally, the access network may include functionality including an mm-wave RAN; advanced or massive MIMO configurations (e.g., an 8×8 antenna configuration, a 16×16 antenna configuration, a 256×256 antenna configuration, etc.); cooperative MIMO; carrier aggregation; relay stations; Heterogeneous Networks of overlapping small cells and macrocells; SON functionality; and MTC functionality.

Turning now to database 310, database 310 can be any collection of records. In one embodiment, database 310 corresponds with a memory that includes a set of embodied computer-executable instructions that, when executed, facilitate various aspects disclosed herein. Additionally, "computer-readable medium" (e.g., flash memory, magnetic disk) includes a single medium or multiple media, such as a centralized or distributed database, and/or associated caches and servers that store one or more sets of computer-executable instructions. The computer-executable instructions will variously be referred to as "instructions" or an "application" for short.

In some embodiments, database 310 may store different types of data. In some embodiments, database 310 corresponds to one or more of a graph database, a relational database, an array-based database (e.g., TileDB), and so forth. In some embodiments, the particular database used to store certain visual data may depend on the type of data, such as raw visual data or pixels, compressed visual data, visual metadata, and so forth. Visual data may be stored directly as files or in various types of databases (e.g., key-value, relational, and/or graph databases). Visual metadata may be stored in databases and the images and videos may be stored as files.

Turning now to cell site 314, the terms "cell site" and "base station" may be used interchangeably herein to refer to a defined wireless communications serviceable area that is serviced by a base station. Cell site 314 may provide wireless communication services to UEs 302, 304, and 306. In particular, cell site 314 may be configured to wirelessly communicate with the UEs, which are located within a serviceable area defined by a transmission range and/or receiving range of the first antenna array 315 of the cell site 314.

Cell site 314 may include one or more carriers, band pass filters, radios, antennas, antenna arrays, power amplifiers, transmitters/receivers, digital signal processors, control electronics, GPS equipment, and the like. As discussed herein, cell site 314 is deployed in a network to control and facilitate, via one or more antenna arrays, the broadcast, transmission, synchronization, and receipt of one or more wireless signals in order to communicate with, verify, authenticate, and provide wireless communications service coverage to one or more UEs and/or other types of devices that request to join and/or are connected to the network.

In some aspects, cell site 314 may comprise one or more macro cells (providing wireless coverage for users within a large serviceable area). For example, macro cells may correspond to a coverage area having a radius of approximately 1-15 miles or more, the radius measured at ground level and extending outward from an antenna at the cell site. In some aspects, cell site 314 may comprise, or be in communication with, one or more small cells (providing wireless coverage for users within a small geographic area). For example, a small cell may correspond to a coverage area having a radius of approximately less than three miles, the radius measured at ground level and extending outward from an antenna at the cell site. In embodiments, cell site 314 is in communication with a plurality of in-door small cells. In some embodiments, the network environment includes a heterogeneous network having both the one or more small cells and the one or more macro cells.

Furthermore, the one or more small cells may support mmWaves via mmWave nodes corresponding to an antenna. Additionally, the one or more small cells may combine a plurality of 100 MHz channels. Continuing the example, the one or more small cells may also combine radio and antenna elements. Further, the one or more small cells may each have an Ethernet cable backhaul. Additionally, the one or more small cells may have the capability of transferring data to multiple user devices during a single point in time via a plurality of antennas (e.g. via a multi-user MIMO antenna system).

In some embodiments, cell site 314 comprises at least a first antenna array 315 having one or more antenna elements 316. In aspects, the one or more antenna elements may be dipole antennas having a length, for example, of ¼, ½, 1, or 1½ wavelength. In aspects, the first antenna array may be an active antenna array, FD-MIMO, massive MIMO, 3G, 4G, 5G, another generation communication system, and/or 802.11. In other aspects, the first antenna array may comprise monopole, loop, parabolic, traveling-wave, aperture, yagi-uda, conical spiral, helical, conical, radomes, horn, and/or apertures, or any combination thereof.

By way of a non-limiting example, the first antenna array 315 may comprise 64 antenna elements arranged in an 8×8 structure. In other aspects, the first antenna array 315 may comprise antenna elements arranged in an 8×4, 4×8, or 4×4 configuration. Each antenna element of the first antenna array 315 may have a dedicated power supply that supplies power having a certain phase and amplitude to a respective antenna element. In an aspect, the power supply comprises a power amplifier. In various aspects, the power supply may additionally comprise a processor for controlling or adjusting the power supply to the respective antenna element. In some aspects, each power supply may have a maximum power to supply to its respective antenna element. In aspects, the maximum per-antenna supply power may be 2.5 W, 3.5 W, 4 W, 5 W, or more.

Turning to AL management engine 320 and beginning with receiver 322, the receiver 322 may retrieve and/or receive data from UEs 302-306 (and other UEs not depicted), various networks, databases, other cell sites, other devices, etc. In some embodiments, the receiver 322 may receive one or more signals/signal information (e.g., downlink signal information) from UEs in communication with the cell site 314. Additionally, receiver 322 may retrieve this information at various times (e.g., at specific times each day, within predetermined time periods, etc.). Continuing the example, the cell site 314 may receive channel signal feedback via a feedback reporting procedure. The feedback may include antenna configuration, downlink SINR, downlink RSRP, the type of the UE receiver, etc. The receiver 322 may receive various UE reports based on downlink transmissions from the cell site 314 that the UEs transmit to cell site 314 (e.g., via uplink channels at predetermined time intervals or upon a predetermined trigger).

For example, the UEs may receive downlink control information from cell site 314, and then transmit the UE reports to the cell site 314 via an uplink shared channel having a particular transmission power based on a power control command. The downlink control information may comprise a hybrid automatic repeat request process number, a redundancy version, a value of modulation and coding scheme, a parameter associated with a resource block assignment, a layer 1 RSRP, and so forth. Furthermore, in some embodiments, receiver 322 receives various detected downlink RF conditions, such as RSRP, RSRQ, and reported channel quality indicator, for example; as well as various uplink RF conditions, such as SRS strength or quality.

In aspects, receiver 322 receives information from various UEs in communication with the cell site 314, the UEs being configured to receive a multiple port (multi-port) CSI-RS pattern from an eNB associated with cell site 314. The multi-port CSI-RS pattern is associated with multiple antenna ports. The UEs are further configured to calculate an RSRP and/or an RSRQ for each antenna port associated with the CSI-RS pattern. The UEs are further configured to communicate feedback reporting, comprising the RSRP and/or the RSRQ for each antenna port, to the eNB. In one embodiment, the UEs are further configured to select an antenna port having a highest received power or a highest received quality and provide feedback to the eNB of the selected antenna port.

The feedback reports that the receiver 322 receives from the UEs may include the downlink signal information from the UEs 302-306 that have used a CSI-RS in a multi-beam system to estimate beam quality of links between UEs 302-306 and cell site 314. For example, based on a measurement of a CSI-RS, a UE may report CSI parameters for downlink channel adaption, the parameters including a PMI, a channel quality index value, and/or a rank indicator. The feedback report may also include a beam index based on an RSRP measurement on a CSI-RS. The beam index may also be reported in a CSI resource indication for downlink beam selection. Further, a CSI-RS may comprise an indication of a beam direction.

In some embodiments, a CSI-RS resource (e.g., one or more antenna ports, one or more time and/or frequency radio resources) may be configured in a cell-specific way (e.g., via common radio resource control signaling). Additionally or alternatively, the CSI-RS resource may be configured in a wireless device-specific way (e.g., via dedicated RRC signaling and/or layer 1 and/or layer 2 signaling). Further, cell site 314 may configure different CSI-RS resources in different terms for different purposes. For example, different terms may include cell-specific, device-specific, periodic, aperiodic, multi-shot, and/or other terms. Different purposes may include, for example, beam management, channel quality indicator reporting, or other purposes.

In embodiments, the signal information is quantized to reduce a size of the feedback received by the receiver 322. In embodiments, the receiver 322 receives precoding matrices corresponding to a channel. In some embodiments, feedback received by the receiver 322 includes slow-fading and fast-fading information corresponding to a channel. As such, with respect to fast-fading and slow-fading, the receiver 322 may also receive information corresponding to Doppler spread, coherence time, symbol periods, changes to impulse responses, mobility, signal path change, shadowing, instances of physical obstructions, constructive interference patterns, destructive interference patterns, and so forth.

Other channel information the receiver 322 may receive includes one or more qualities of communication between one or more user devices and particular antennas of cell site 314. For example, one or more processors may quantify how communications are traveling over a particular channel, thus indicating when communications performance is negatively impacted or impaired. As such, channel information the receiver 322 receives may indicate a realized uplink and/or downlink transmission data rate of a cell site and/or each of one or more UEs communicating with the cell site 314, observed SINR and/or signal strength at a UE, or throughput of the connection between the cell site 314 and the UEs, etc. The receiver 322 may also be configured to receive information from cell sites other than cell site 314 or other processors and/or servers.

Furthermore, additional data the receiver 322 may access includes, but is not limited to, location information of the UEs. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example.

Turning now to threshold determination component 324, threshold determination component 324 determines a threshold for a radio frequency condition. The threshold may be determined based on various combinations of the information received by receiver 322. For example, in embodiments, the radio frequency condition corresponds to whether a downlink RSRP or a downlink SINR is above the threshold. The threshold may be easier for a UE to reach when measuring the downlink RSRP, relative to the threshold for the downlink SINR, and vice versa. In some embodiments, the threshold will be determined based on a location of the UE relative to cell site 314. In some embodiments, the threshold will be determined based on the location of the UE relative to an access point different from the cell site 314.

As such, the threshold may fluctuate depending upon the UE location and a fluctuating RF condition of the UE. For example, if a UE has highly fluctuating RF conditions, then uncertainty as to whether the UE will be able to receive transmissions from the cell site 314 increases. Further, highly fluctuating RF conditions affect whether the UE will be able to successfully acknowledge those transmissions. In some embodiments, the threshold will vary based on antenna port, beam management, beam quality estimations, channel quality indicator reporting intervals, etc.

Turning to RF condition determination component 326, the RF condition corresponds to whether a downlink RSRP or a downlink SINR is above the threshold. In aspects, RF condition determination component 326 determines the RF condition based on downlink control information the UEs received from cell site 314 and transmitted back to the cell site 314 thereafter. In some embodiments, RF condition determination component 326 determines the RF condition based on information from one or more feedback reports. In some embodiments, the downlink RSRP is associated with at least one antenna port that is associated with a particular CSI-RS pattern. In some embodiments, the RF condition is determined based on feedback received by the receiver 322 corresponding to slow-fading and/or fast-fading information associated with a particular channel.

In some embodiments, RF condition determination component 326 determines whether each of the UEs 302-306 have RF conditions that are stable. The term "RF conditions" refers to one or more metrics related to RF communication between cell site 314 and a UE. Examples of the one or more metrics include CQI, SINR, RSRP, and RSRQ, BLER, and/or retransmission rate, etc. In some embodiments, RF condition determination component 326 may determine UE 302 has a more stable RF condition than UE 304, which has a more stable RF condition than UE 306. RF condition determination component 326 may use any information received by receiver 322 to determine whether the downlink RSRP or the downlink SINR is above the respective threshold.

To facilitate this determination, RF condition determination component 326 could determine in various ways the level of stability of RF conditions respectively of each UE in communication with cell site 314. For instance, RF condition determination component 326 could gauge a level of stability of a UE's RF conditions based on a rate of change of the one or more metrics (e.g., CQI, SINR, RSRP, and RSRQ, BLER, and/or retransmission rate), wherein a higher rate of change corresponds with a lower stability, and vice versa.

Turning to PRACH preamble group assigning component 328, PRACH preamble groups are assigned based on preamble IDs (i.e., signatures). In some embodiments, a first set of consecutive PRACH preambles are assigned to a first PRACH preamble group and a second set of consecutive PRACH preambles are assigned to a second PRACH preamble group, the second set of consecutive PRACH preambles having higher preamble IDs than the first set. In addition, a third set of consecutive PRACH preambles are assigned to a third PRACH preamble group, the third set of consecutive PRACH preambles having higher preamble IDs than the second set. In some embodiments, the preamble IDs are sequenced based on Zadoff Chu sequencing. In some embodiments, a total number of PRACH preambles is 64.

Turning to PDCCH CCE AL determination component 330, a PDCCH CCE AL is determined for a device based on the PRACH preamble group assigned for the device. For example, five different PDCCH CCE ALs are supported in 5G NR. These ALs include CCE AL 1, CCE AL 2, CCE AL 4, CCE AL 8, and CCE AL 16. Each CCE AL specifies a number of CCEs required to carry a PDCCH DCI message. The number of resource elements required to carry a PDCCH DCI message (an "AL") is expressed via CCE. As such, the number of resource elements/CCE for a PDCCH candidate is determined based on the CCE AL. Table 1 depicted below illustrates PDCCH ALs:

| AGGREGATION LEVEL | NUMBER OF CCEs |
| --- | --- |
| 1 | 1 |
| 2 | 2 |
| 4 | 4 |
| 8 | 8 |
| 16 | 16 |

Because the PDCCH CCE AL is determined for a device based on the PRACH preamble group, the PDCCH CCE AL depends upon whether a downlink RSRP or a downlink SINR of the corresponding device is above the threshold. If the downlink RSRP or the downlink SINR of the corresponding device is above the threshold, then the device is assigned to the first PRACH preamble group and the PDCCH CCE AL for the device is determined based on the first PRACH preamble group. Further, if the downlink RSRP or the downlink SINR of the corresponding device is not above the threshold, then the device is assigned to the second PRACH preamble group and the PDCCH CCE AL for the device is determined based on the second PRACH preamble group. Furthermore, if the downlink RSRP or the downlink SINR of the corresponding device is not above a second threshold that is lower than the first threshold, then the device is assigned to the third PRACH preamble group and the PDCCH CCE AL for the device is determined based on the third PRACH preamble group.

Turning now to broadcasting component 332, the broadcasting component may broadcast from the cell site 314 to the UE a broadcasting message that includes the PRACH preamble group, the PDCCH CCE AL, the first threshold, the second threshold, and/or any additional thresholds. The broadcasting component 332 may broadcast the thresholds previously determined by the AL management engine 320 based on one or more RF conditions of the UE and based on how the AL management engine 320 grouped the PRACH preambles. Further, the broadcasting component 332 broadcasts the broadcasting message upon receiving a request from the UE for a random-access channel response. In some embodiments, broadcasting the assigned PRACH preamble group to the UE includes transmitting a PRACH group number in a system information broadcasting message.

Figure 4:
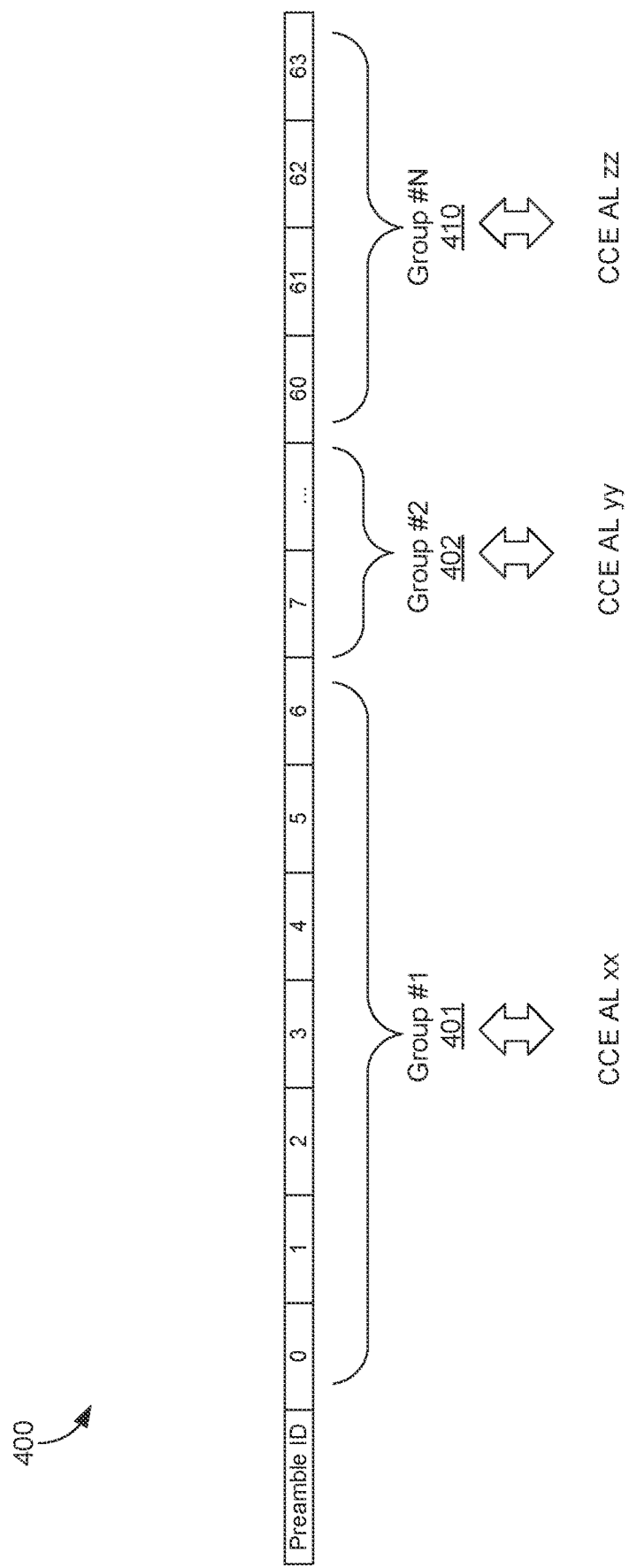
FIG. 4 depicts example physical random access channel preamble groupings for use in implementations of the present disclosure, in accordance with aspects herein.

Turning to FIG. 4, environment 400 illustrates an example of PRACH preamble groupings. In this example embodiment, a first PRACH preamble grouping 401 includes seven consecutive preamble IDs (0-6), a second PRACH preamble grouping 402 includes additional consecutive preamble IDs that are higher than the preamble IDs of the first PRACH preamble grouping 401. Additional PRACH preamble grouping 410 includes consecutive preamble IDs that are higher than the preamble IDs of the second PRACH preamble grouping 402. Assigned PRACH preamble groups correspond to the CSS.

In some embodiments, the PRACH preambles are assigned to groups based on the RF conditions of the UEs requesting for a RACH within a predetermined time interval. In some embodiments, the PRACH preambles are assigned to groups based on CCE AL candidates. In some embodiments, the PRACH preambles are assigned to groups based on the RF conditions of a particular group of UEs requesting for a RACH (e.g., those located within a predetermined area and/or those having certain transmitting and receiving capabilities). In some embodiments, the PRACH preambles are assigned to groups based on formats of the preambles (e.g., short format and long format), cyclic prefixes, payload (e.g., a RACH message), a guard time, and/or other unused resources in which no data transmissions are occurring. In some embodiments, the PRACH preambles are assigned to groups based on cell size and cell radius.

Figure 5:
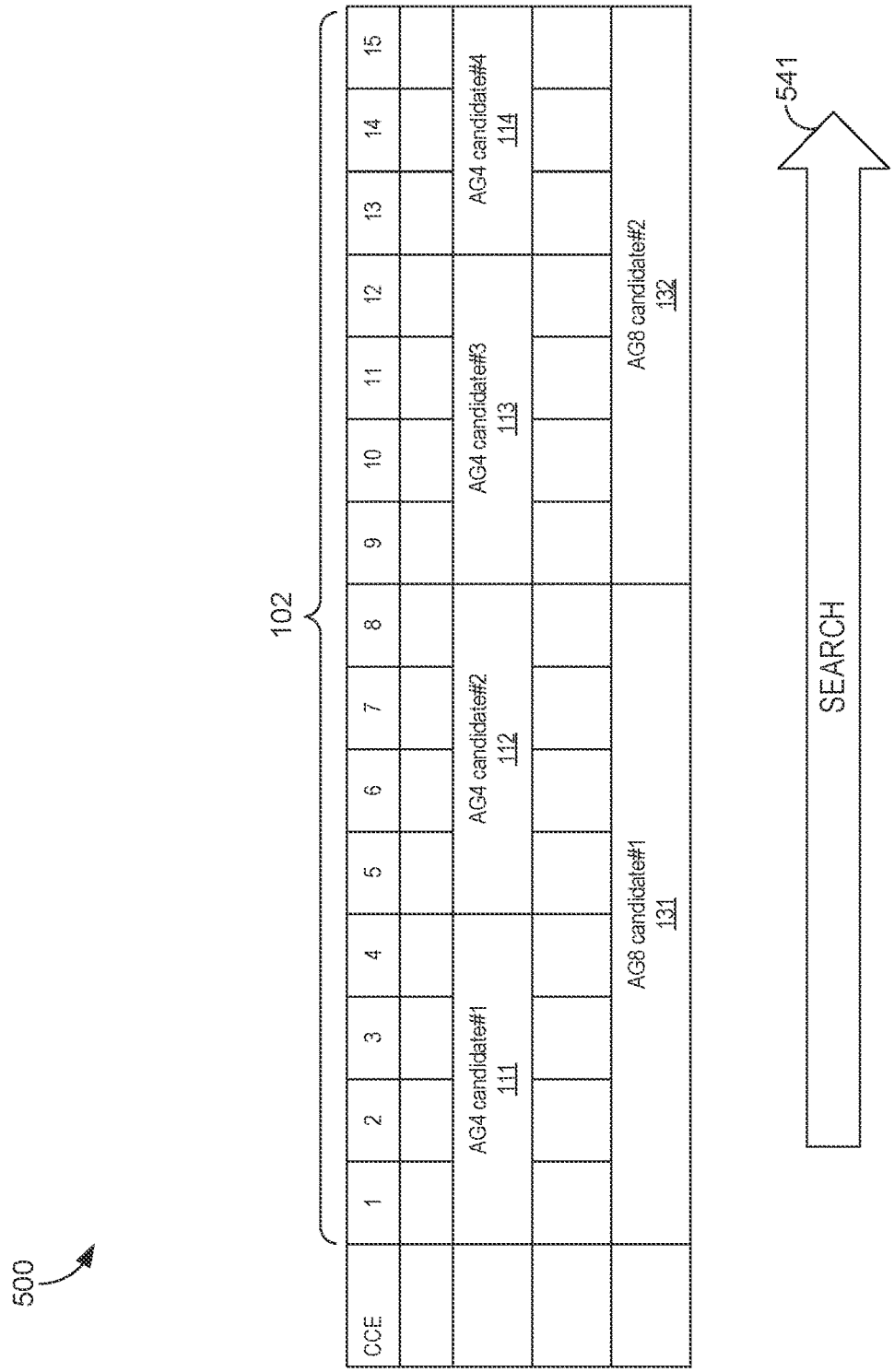
FIG. 5 depicts an example non-blind search in a common search space for use in implementations of the present disclosure, in accordance with aspects herein.

Turning now to FIG. 5, environment 500 illustrates an example non-blind search 541 in a common search space. In a non-blind search, a UE is provided with the number of CCEs occupied by the current PDCCH. Further, the UE is provided with DCI format information, where the information it needs is located, and/or threshold information corresponding to SINR and/or RSRP.

The environment 500 includes CCEs 102 (e.g., CCEs 1-15); CCE AL 4 having a first candidate 111, a second candidate 112, a third candidate 113, and a fourth candidate 114; and CCE AL 8 having a first candidate 131 and a second candidate 132. The CCE AL 4 first candidate 111 corresponds to CCEs 1-4. The CCE AL 4 second candidate 112 corresponds to CCEs 5-8. The CCE AL 4 third candidate 113 corresponds to CCEs 9-12. The CCE AL 4 fourth candidate 114 corresponds to CCEs 12-16 (CCE 16 not depicted). Further, CCE AL 8 candidate 131 corresponds to CCEs 1-8 and CCE AL 8 candidate 132 corresponds to CCEs 9-16 (CCE 16 not depicted).

Example non-blind search 541 knows the number of CCEs occupied by the PDCCH and does not need to sequentially search and perform channel estimation on each of the first candidate 111, the second candidate 112, the third candidate 113, the fourth candidate 114, the first candidate 131, and the second candidate 132 until matching the RNTI scrambled with DCI CRC by trial-and-error (as required by the blind search of FIG. 1).

Figure 6:
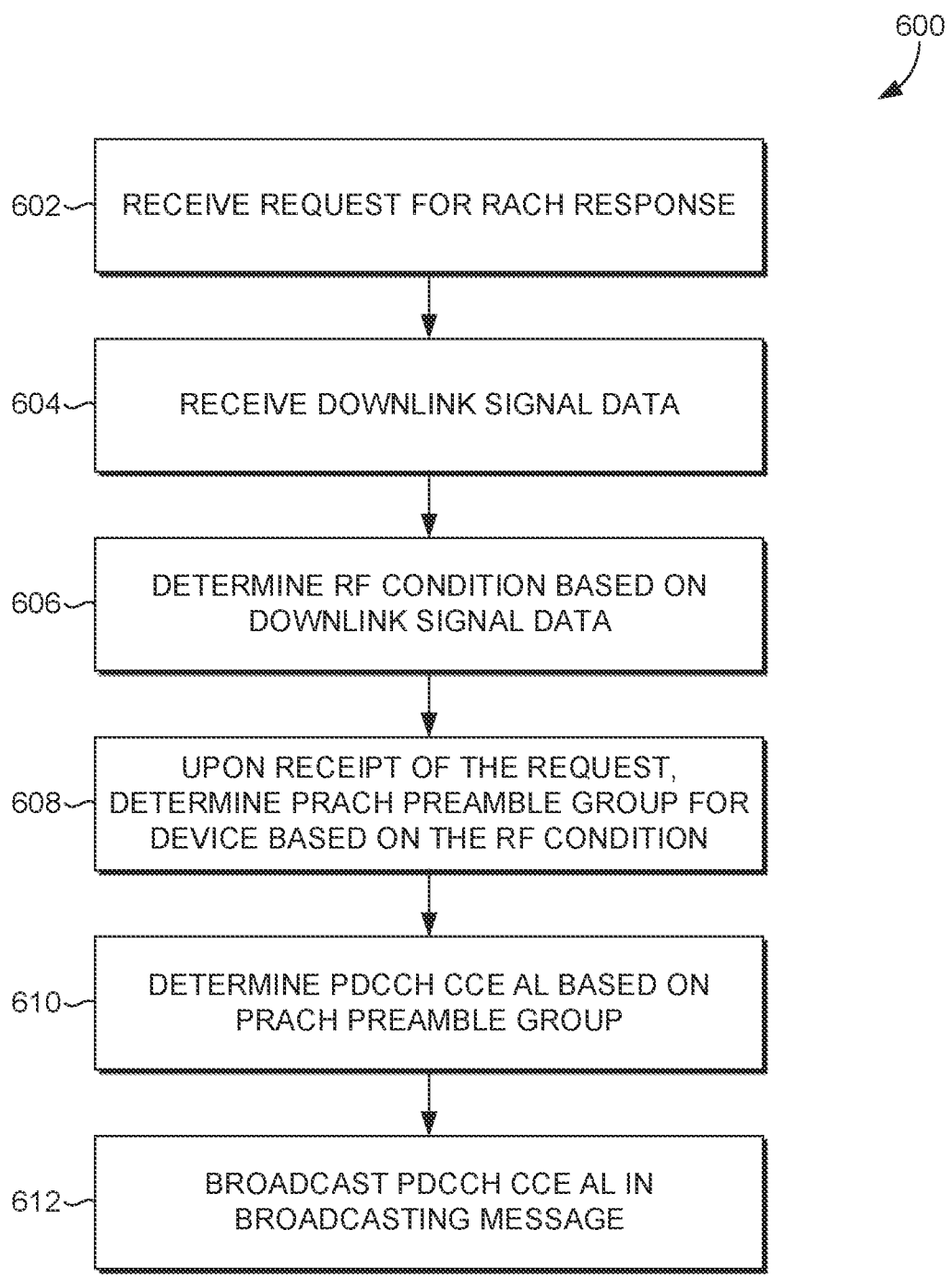
FIG. 6 depicts an example flow diagram for use in implementations of the present disclosure, in accordance with aspects herein.

Turning to FIG. 6, flowchart 600 begins with receiving a request for a RACH response from a UE at step 602 and receiving one or more downlink signal data from the UE at step 604. The one or more downlink signal data may include downlink RSRP and SINR. In some embodiments, the one or more downlink signal data may be received from a plurality of UEs and/or another type of signal detecting device. Further, the method determines an RF condition of the UE based on the one or more downlink signal data received at step 606. In embodiments, the RF condition corresponds to whether the downlink RSRP is above a threshold. In embodiments, the RF condition corresponds to whether the downlink SINR is above the threshold.

Further, the method determines a PRACH preamble group for the UE based on the RF condition and upon receipt of the request for the RACH response at step 608. The PRACH preamble group corresponds to a CSS. In embodiments, a first set of consecutive PRACH preambles is assigned to a first PRACH preamble group and a second set of consecutive PRACH preambles is assigned to a second PRACH preamble group. Continuing the example, the second set of consecutive PRACH preambles have higher preamble IDs than the first set of consecutive PRACH preambles.

In addition, the method determines a PDCCH CCE AL based on the PRACH preamble group determined for the UE at step 610. The PDCCH CCE AL will be different when the UE is assigned the first PRACH preamble group instead of the second PRACH preamble group. In some embodiments, the PDCCH CCE AL is four. In some embodiments, the PDCCH CCE AL is eight. In some embodiments, the PDCCH CCE AL is sixteen.

Further, the method includes broadcasting the PDCCH CCE AL in a broadcasting message to the UE at step 612. In some embodiments, the broadcasting message to the UE includes the PRACH preamble group assigned. In some embodiments, the broadcasting message to the UE includes the PRACH preamble group assigned but not the PDCCH CCE AL. In embodiments, a base station broadcasts the broadcasting message upon receiving the request for the RACH response and based on the RF condition. In embodiments, broadcasting the assigned PRACH preamble group to the device includes transmitting a PRACH group number in a system information broadcasting message.

Figure 7:
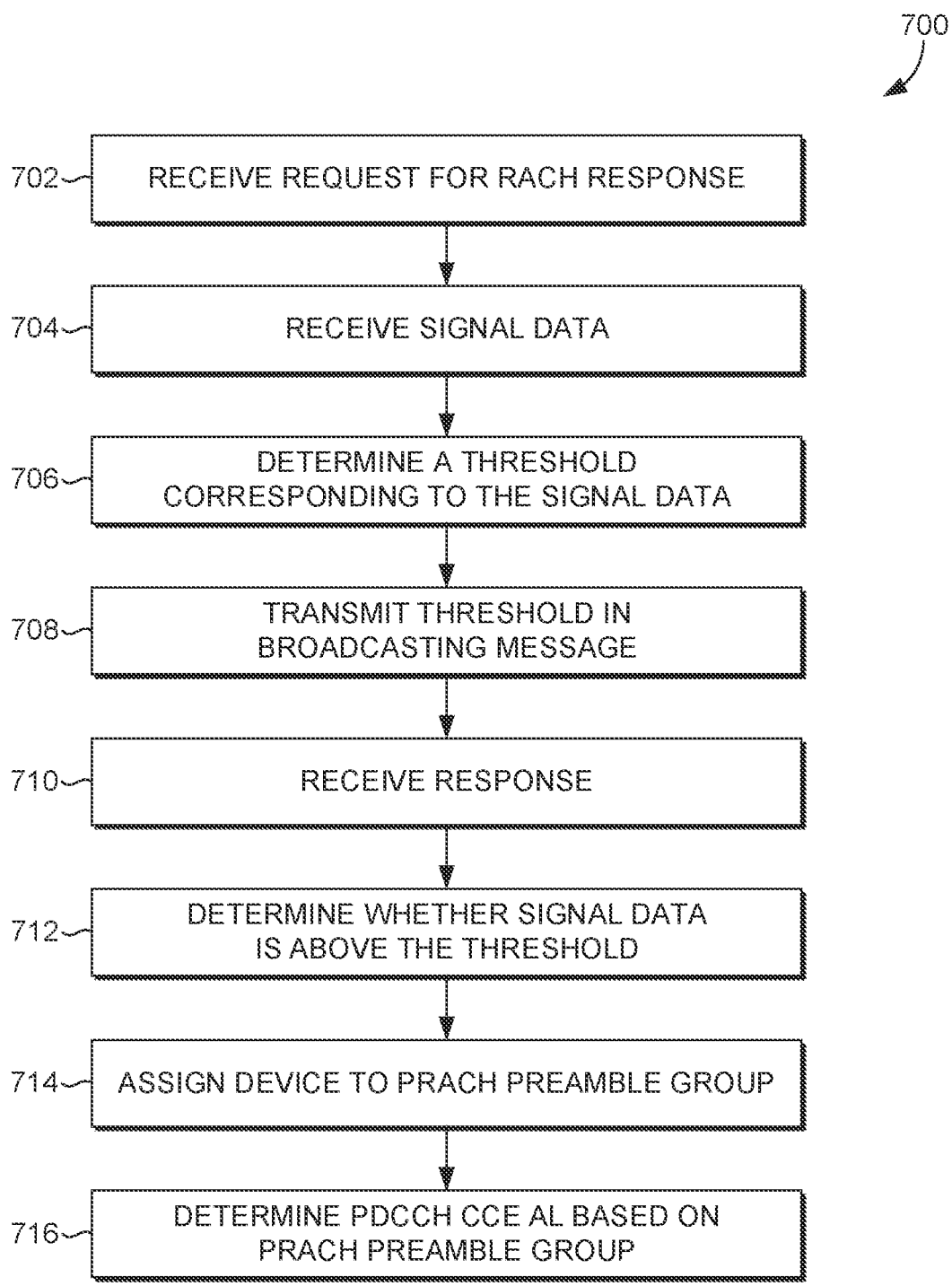
FIG. 7 depicts another example flow diagram for use in implementations of the present disclosure, in accordance with aspects herein.

Turning now to FIG. 7, example flow diagram 700 begins with receiving a request for RACH response from a UE at step 702. Additionally, the method continues with receiving signal data from the UE at step 704. The signal data may include downlink RSRP and SINR. In some embodiments, the signal data may be received from a plurality of UEs and/or another type of signal detecting device. In addition, the method determines a threshold corresponding to the signal data received at step 706. The threshold may correspond to a downlink RSRP value or a downlink SINR value. At step 708, the threshold is broadcast to the UE in a broadcasting message for the UE to determine whether signals it is receiving are above or below the threshold value. In some embodiments, a processor directly associated with the cell site determines whether the downlink SINR or the downlink RSRP is above the threshold.

At step 710, a cell site receives a response from the UE. The response from the UE may include additional signal data and/or an indication that the UE has received one or more signals or a pattern of signals that are above the threshold. Based on the response from the UE, the method determines whether the signal data is above the threshold at step 712. In some embodiments, a processor associated with the cell site determines whether the signal data is above the threshold based on additional signal data from the UE received in the response. In some embodiments, the processor determines whether the signal data is above the threshold based on one or more determinations made by the UE and transmitted to the cell site in the response. In some embodiments, step 712 corresponds to a determination that downlink RSRP data is above, at, or below the threshold. In some embodiments, step 712 corresponds to a determination that downlink SINR data is above, at, or below the threshold.

Turning to step 714, the method assigns the UE to a PRACH preamble group based on the determination at step 712. In embodiments, upon determining that the downlink RSRP or the downlink SINR is above the threshold, the method at step 714 assigns the UE to a first PRACH preamble group comprising a first set of consecutive PRACH preambles having lower preamble IDs than other sets of consecutive PRACH preambles that were grouped together. In this embodiment, at step 716, the method determines a PDCCH CCE AL for the UE based on assigning the UE to the first PRACH preamble group and then schedules the PDCCH CCE AL for the device. In another embodiment, upon determining that the downlink RSRP or the downlink SINR is not above the threshold, the method at step 714 assigns the UE to a second PRACH preamble group comprising a second set of consecutive PRACH preambles having higher preamble IDs than the first set of consecutive PRACH preambles of the first PRACH preamble group. In this embodiment, at step 716, the method determines a PDCCH CCE AL for the UE based on assigning the UE to the second PRACH preamble group then schedules the PDCCH CCE AL for the device.

Figure 8:
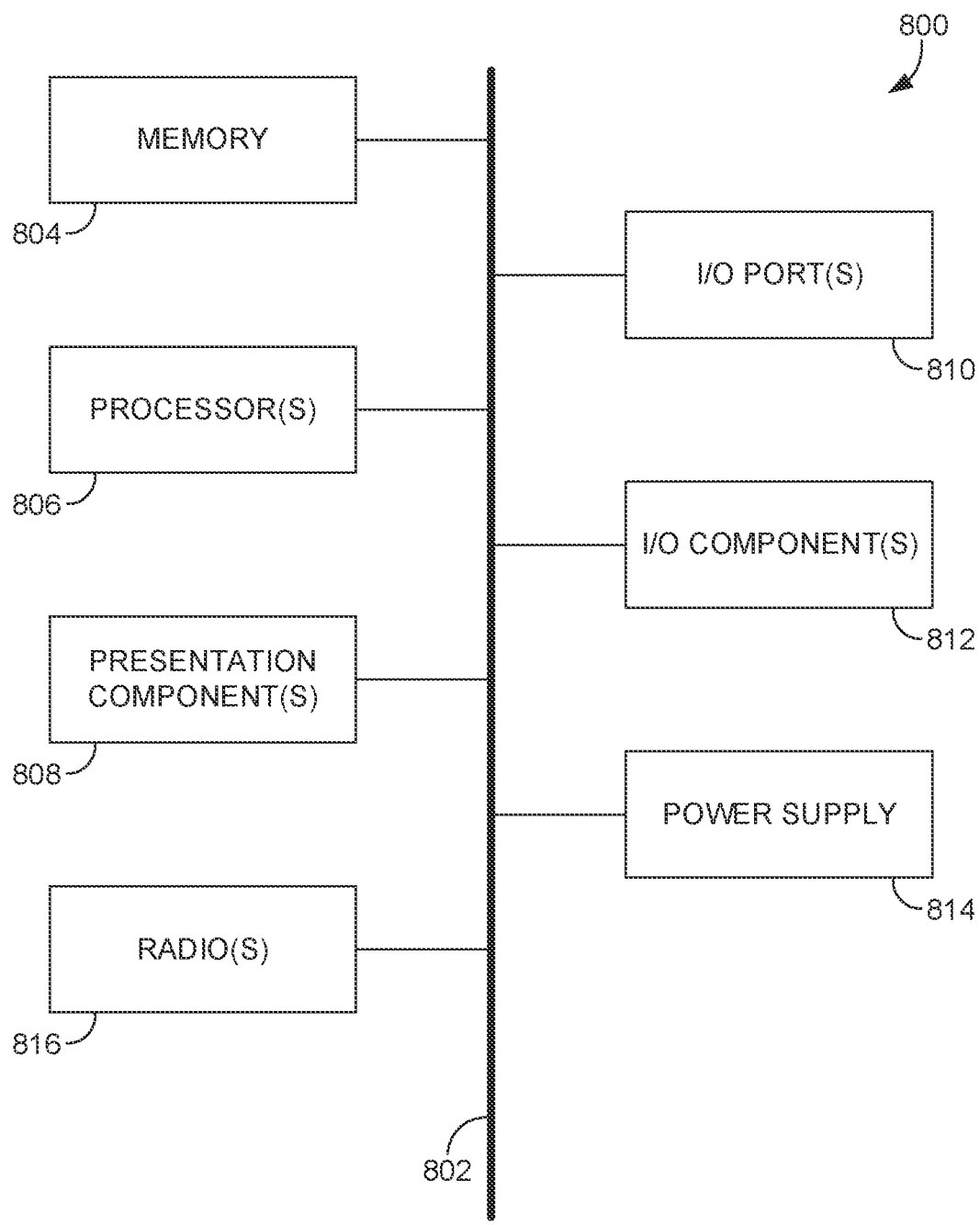
FIG. 8 depicts an example computing environment suitable for use in implementations of the present disclosure, in accordance with aspects herein.

Turning now to FIG. 8, a diagram is depicted of an exemplary computing environment suitable for use in implementations of the present disclosure. In particular, the exemplary computer environment is shown and designated generally as UE/user device 800. User device 800 is but one example of a suitable computing environment and is not intended to suggest any limitation as to the scope of use or functionality of the invention. Neither should user device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, user device 800 includes bus 802 that directly or indirectly couples the following devices: memory 804, one or more processors 806, one or more presentation components 808, input/output (I/O) port(s) 810, I/O component(s) 812, power supply 814, and radio(s) 816. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O component(s) 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "user device."

User device 800 typically includes a variety of computer-readable media. Computer-readable media can be any available media that can be accessed by user device 800. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 804, memory 804 includes computer-storage media in the form of volatile and/or nonvolatile memory. Memory 804 may be removable, nonremovable, or a combination thereof. Examples of memory 804 include solid-state memory, hard drives, optical-disc drives, etc. For instance, memory 804 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 806, the one or more processors 806 read data from various entities such as bus 802, memory 804 or I/O component(s) 812. The one or more processors 806 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 806 execute instructions, for example, of an Operating System of the user device 800 and/or of one or more suitable applications.

Further, the one or more presentation components 808 present data indications to a person or other device. Examples of one or more presentation components 808 include a display device, speaker, printing component, vibrating component, etc. Additionally, I/O port(s) 810 allow user device 800 to be logically coupled to other devices including I/O component(s) 812, some of which may be built in user device 800. Illustrative I/O component(s) 812 include a microphone, joystick, game pad, satellite dish, scanner, printer, wireless device, etc. Furthermore, power supply 814 may include any suitable source of power, such as a rechargeable lithium polymer battery and/or an alternating current power converter.

Turning to radio 816, the radio 816 facilitates communication with a wireless telecommunications network. For example, radio 816 may facilitate communication via wireless communication signals, RF signals, frames, blocks, transmission streams, packets, messages, data items, and/or data. The terms "radio," "controller," "antenna," and "antenna array" are used interchangeably to refer to one or more software and hardware components that facilitate sending and receiving wireless radio-frequency signals, for example, based on instructions from a cell site. Radio 816 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via mmWaves, FD-MIMO, massive MIMO, 3G, 4G, 5G, and/or 802.11 protocols and techniques, etc.

Illustrative wireless telecommunications technologies that radio 816 may facilitate include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies and/or multiple radios can be utilized to support multiple technologies.

The invention claimed is:

1. A system for supporting a non-blind scheduling of a physical downlink control channel (PDCCH) aggregation level (AL) for a search space, the system comprising:
    an antenna array comprising one or more antenna elements; and
    one or more processors configured to execute operations comprising:
        receiving one or more signals corresponding to a device;
        receiving a request for a random-access channel response from the device;
        determining a radio frequency condition for the device based on the one or more signals; and
        upon receiving the request and based on the radio frequency condition, broadcasting an assigned physical random access channel (PRACH) preamble group to the device for scheduling the PDCCH AL, the assigned PRACH preamble group corresponding to the search space.

2. The system of claim 1, wherein the search space is a common search space (CSS), wherein the AL is a PDCCH control channel element (CCE) AL, and wherein the system further comprises:
    determining the PDCCH CCE AL for the device based on the assigned PRACH preamble group; and
    scheduling the PDCCH CCE AL for the device.

3. The system of claim 1, wherein the search space is a common search space (CSS), wherein the AL is a PDCCH control channel element (CCE) AL, and wherein the system further comprises:
    assigning a first set of consecutive PRACH preambles to a first PRACH preamble group;
    assigning a second set of consecutive PRACH preambles to a second PRACH preamble group, the second set of consecutive PRACH preambles having higher preamble IDs than the first set; and
    scheduling the PDCCH CCE AL for the device based on the assigned PRACH preamble group being the first PRACH preamble group or the second PRACH preamble group.

4. The system of claim 3, wherein the one or more signals includes a downlink reference signal received power (RSRP), wherein the radio frequency condition corresponds to whether the downlink RSRP is above a threshold; and wherein the operations further comprise:
    determining the threshold for the radio frequency condition;
    broadcasting the threshold to the device; and
    based on broadcasting the threshold, receiving a response from the device.

5. The system of claim 4, wherein the operations further comprise:
    based on the response, determining that the downlink RSRP is above the threshold;
    assigning the device to the first PRACH preamble group; and
    determining the PDCCH CCE AL for the device based on the first PRACH preamble group.

6. The system of claim 5, wherein the PDCCH CCE AL is four.

7. The system of claim 4, wherein the operations further comprise:
    based on the response, determining that the downlink RSRP is below the threshold;
    assigning the device to the second PRACH preamble group; and
    determining the PDCCH CCE AL for the device based on the second PRACH preamble group.

8. The system of claim 7, wherein the PDCCH CCE AL is eight.

9. The system of claim 1, wherein broadcasting the assigned PRACH preamble group to the device includes transmitting a PRACH group number in a system information broadcasting message, and wherein a total number of PRACH preambles is 64.

10. The system of claim 1, wherein the antenna array has at least one node and the at least one node is a gNodeB.

11. A method for non-blind scheduling of a physical downlink control channel (PDCCH) aggregation level (AL) for a search space, the method comprising:
    receiving one or more signals corresponding to a device;
    receiving a request for a random-access channel response from the device;
    determining a radio frequency condition for the device based on the one or more signals;
    based on the radio frequency condition, determining a physical random access channel (PRACH) preamble group for the device for scheduling the PDCCH AL, the PRACH preamble group corresponding to the search space; and
    upon receiving the request, broadcasting the PRACH preamble group to the device.

12. The method of claim 11, further comprising scheduling the PDCCH AL for the device based on the PRACH preamble group.

13. The method of claim 11, further comprising:
assigning a first set of consecutive PRACH preambles to a first PRACH preamble group;
assigning a second set of consecutive PRACH preambles to a second PRACH preamble group, the second set of consecutive PRACH preambles having higher preamble IDs than the first set; and
scheduling the PDCCH AL for the device based on the PRACH preamble group being the first PRACH preamble group or the second PRACH preamble group.

14. The method of claim 13, wherein the search space is a common search space (CSS), wherein the AL is a PDCCH control channel element (CCE) AL, wherein the one or more signals includes a downlink signal-to-interference-plus-noise ratio (SINK), wherein the radio frequency condition corresponds to whether the downlink SINR is above a threshold, and wherein the method further comprises:
determining the threshold for the radio frequency condition;
broadcasting the threshold to the device; and
based on broadcasting the threshold, receiving a response from the device.

15. The method of claim 14, the method further comprising:
based on the response, determining that the downlink SINK is above the threshold;
assigning the device to the first PRACH preamble group; and
determining the PDCCH CCE AL for the device based on the first PRACH preamble group.

16. The method of claim 15, wherein the PDCCH CCE AL is four.

17. The method of claim 14, further comprising:
based on the response, determining that the downlink SINR is below the threshold;
assigning the device to the second PRACH preamble group; and
determining the PDCCH AL for the device based on the second PRACH preamble group.

18. The method of claim 17, wherein the PDCCH CCE AL is eight.

19. Non-transitory computer-readable storage media having computer-executable instructions embodied thereon that, when executed by one or more processors, cause the one or more processors to perform operations for non-blind scheduling of a physical downlink control channel (PDCCH) aggregation level (AL) for a search space, the operations comprising:
receiving one or more downlink signals corresponding to a device;
receiving a request for a random-access channel response from the device;
determining a radio frequency condition for the device based on the one or more downlink signals, the radio frequency condition corresponding to whether the one or more downlink signals is above a threshold;
based on the radio frequency condition, determining a physical random access channel (PRACH) preamble group for the device for scheduling the PDCCH AL, the PRACH preamble group corresponding to the search space; and
upon receiving the request, broadcasting the PRACH preamble group to the device.

20. The non-transitory computer-readable storage media of claim 19, wherein the search space is a common search space, wherein the AL is a PDCCH control channel element AL, and wherein the one or more downlink signals correspond to a signal-to-interference-plus-noise ratio (SINR) or a reference signal received power (RSRP).

\* \* \* \* \*

UNITED STATES PATENT AND TRADEMARK OFFICE
CERTIFICATE OF CORRECTION

| | | |
|---|---|---|
| PATENT NO. | : 12,004,231 B1 | Page 1 of 1 |
| APPLICATION NO. | : 17/391901 | |
| DATED | : June 4, 2024 | |
| INVENTOR(S) | : Sanghoon Sung | |

It is certified that error appears in the above-identified patent and that said Letters Patent is hereby corrected as shown below:

In the Claims

• Column 19, Line 19, "(SINK)" should read -- (SINR) --.

• Column 19, Line 30, "SINK" should read -- SINR --.

Signed and Sealed this
Thirteenth Day of August, 2024

Katherine Kelly Vidal
*Director of the United States Patent and Trademark Office*